A. H. VITT.
Piston-Rod Packing.
No. 203,391. Patented May 7, 1878.
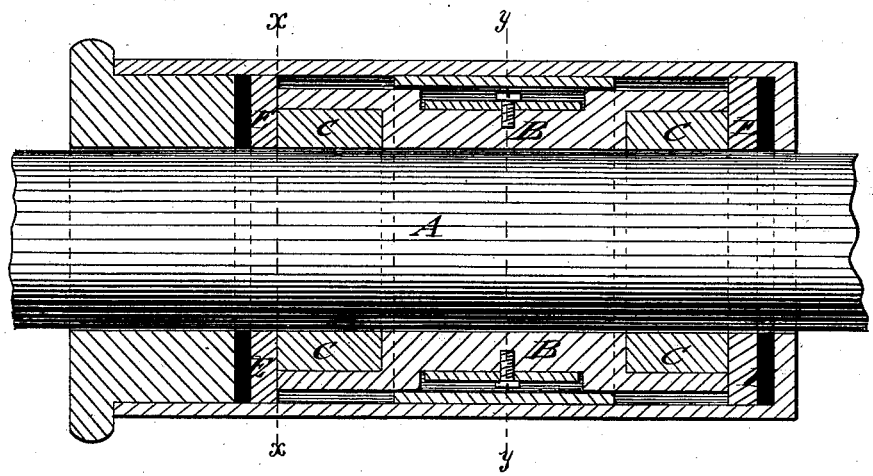
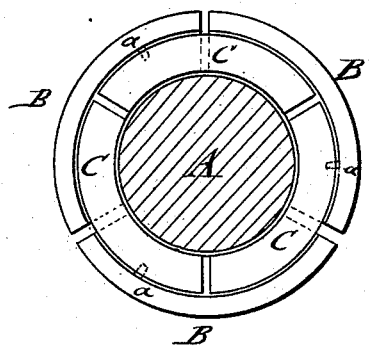
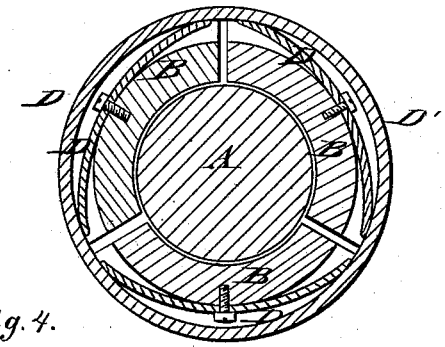
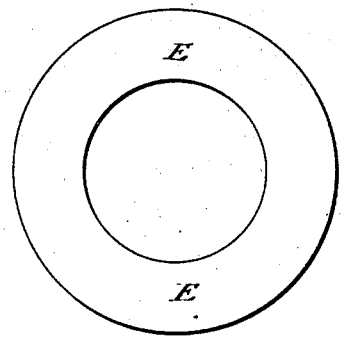
WITNESSES:
Henry N. Miller
C. Sedgwick
INVENTOR:
A. H. Vitt
BY
ATTORNEYS.

UNITED STATES PATENT OFFICE.

ADOLPHUS H. VITT, OF UNION, MISSOURI.

IMPROVEMENT IN PISTON-ROD PACKINGS.

Specification forming part of Letters Patent No. 203,391, dated May 7, 1878; application filed March 23, 1878.

*To all whom it may concern:*

Be it known that I, ADOLPHUS H. VITT, of Union, in the county of Franklin and State of Missouri, have invented a new and Improved Piston-Rod Packing, of which the following is a specification:

In the accompanying drawing, Figure 1 represents a vertical longitudinal section of my improved piston-rod packing, shown as applied to a piston-rod. Figs. 2 and 3 are vertical transverse sections of the same, respectively, on lines $x\ x$ and $y\ y$, Fig. 1; and Fig. 4 is a detailed view of the exterior or binding rings.

Similar letters of reference indicate corresponding parts.

This invention relates to an improved tightly-fitting packing for piston-rods of steam-engines; and consists of recessed sectional shells and sectional brass rings, arranged thereon so as to break joint therewith, in combination with retaining-springs and sleeve and end rings.

Referring to the drawing, A represents a piston-rod, and B a cylindrical shell, that is provided with annular interior recesses at the ends and an annular exterior recess intermediately between the former.

Into the annular end recesses are fitted brass rings C, and then shell and rings cut longitudinally into three or more parts. The interior rings are then shifted on the sectional shells so as to break joints therewith, as shown in Fig. 2, the ring-sections being retained by small pins $a$ on the sections of the shell.

The shell and ring sections are pressed tightly on the piston-rod by means of band-springs D, that are attached by center screws $b$ to the annular central recesses of the shell-sections, and inclosed by an exterior sleeve, D′, over which the gland of the stuffing-box is placed.

The ring-sections are retained in position by end rings E, which are packed by outside rubber washers to produce the steam-tight packing of the rings and prevent the steam from passing outside of or around the packing.

The rings are fitted together so as to form steam-tight joints, the rubber gaskets or washers preventing the steam from leaking around the packing.

The packing can be used in any ordinary stuffing-box, and forms a reliable and durable packing that does not heat or abrade, and requires but a small amount of lubrication.

Having thus described my invention, I claim as new and desire to secure by Letters Patent—

The combination, with the piston-rod A, of the sectional shell B, receiving in recesses the cut rings C at each end, the band-springs D in the middle, the end rings E, and the medium sleeve D′, arranged as shown and described.

ADOLPHUS H. VITT.

Witnesses:
ROBERT HOFFMANN,
CHAS. REINHARD.